(12) United States Patent
Kayser et al.

(10) Patent No.: US 12,449,329 B2
(45) Date of Patent: Oct. 21, 2025

(54) TESTING APPARATUS, IN PARTICULAR TIRE TESTING APPARATUS

(71) Applicant: Italmatic srl, Cassina de' Pecchi (IT)

(72) Inventors: André Kayser, Seebach (FR); Bernhard Leitner, Neubeuern (DE)

(73) Assignee: Italmatic srl, Cassina de' Pecchi (IT)

( * ) Notice: Subject to any disclaimer, the term of this patent is extended or adjusted under 35 U.S.C. 154(b) by 128 days.

(21) Appl. No.: 18/125,349

(22) Filed: Mar. 23, 2023

(65) Prior Publication Data
US 2023/0304898 A1    Sep. 28, 2023

(30) Foreign Application Priority Data

Mar. 23, 2022   (DE) .................. 10 2022 106 813.7

(51) Int. Cl.
*G01M 17/02*   (2006.01)
*B60C 25/00*   (2006.01)

(52) U.S. Cl.
CPC ........... *G01M 17/02* (2013.01); *B60C 25/002* (2013.01); *G01M 17/021* (2013.01)

(58) Field of Classification Search
CPC .... G01M 17/02; G01M 17/021; B60C 25/002
See application file for complete search history.

(56) References Cited

U.S. PATENT DOCUMENTS

| | | | |
|---|---|---|---|
| 4,702,594 A * | 10/1987 | Grant .................. | G01M 17/027 356/458 |
| 7,568,385 B2 | 8/2009 | Maehner et al. | |
| 7,755,746 B2 | 7/2010 | Maehner et al. | |
| 7,856,869 B2 | 12/2010 | Dengler et al. | |
| 7,860,297 B2 | 12/2010 | Wilhelm et al. | |
| 9,658,135 B2 | 5/2017 | Steinbichler et al. | |
| 9,671,313 B2 * | 6/2017 | Steinbichler ........ | G01M 17/027 |
| 2005/0264796 A1 * | 12/2005 | Shaw .................. | G01N 21/954 356/237.2 |

(Continued)

FOREIGN PATENT DOCUMENTS

| | | |
|---|---|---|
| DE | 4002856 A1 | 8/1991 |
| DE | 10102232 C2 | 11/2002 |
| DE | 102005049607 A1 | 4/2007 |

(Continued)

OTHER PUBLICATIONS

Office Action issued in German Patent Application No. DE 10 2022 106 813.7, dated Nov. 25, 2022 (from which this application claims priority) and English language translation thereof.

(Continued)

*Primary Examiner* — Jill E Culler
(74) *Attorney, Agent, or Firm* — Ewers IP Law PLLC; Falk Ewers

(57) ABSTRACT

A testing apparatus, in particular a tire testing apparatus, includes a testing chamber, a pressure loading unit for changing the pressure in the testing chamber and at least one measuring head for measuring a measurement object arranged in the testing chamber at different pressure values produced by the pressure loading unit. It is provided here that, for changing the pressure in the testing chamber, the pressure loading unit changes the volume of the testing chamber while excluding air from the surroundings.

16 Claims, 6 Drawing Sheets

(56) References Cited

U.S. PATENT DOCUMENTS

2016/0239027 A1 8/2016 Klingsheim
2018/0372603 A1 12/2018 Safai et al.

FOREIGN PATENT DOCUMENTS

| DE | 102006015123 B4 | 3/2008 |
| DE | 102006061003 B4 | 3/2009 |
| DE | 102013010402 A1 | 12/2014 |
| DE | 102013102296 B4 | 11/2018 |
| EP | 1959227 B1 | 9/2012 |
| EP | 2851670 B1 | 8/2018 |
| EP | 3521796 A1 | 8/2019 |

OTHER PUBLICATIONS

Search Report issued in European Patent Application No. EP 23158939, dated Aug. 21, 2023 (to which this application claims priority) and English language machine translation thereof.

\* cited by examiner

TESTING APPARATUS, IN PARTICULAR TIRE TESTING APPARATUS

CROSS REFERENCE TO RELATED APPLICATIONS

This application claims priority to German patent application DE 10 2022 106 813.7, filed Mar. 23, 2022, the entire content of which is incorporated herein by reference.

TECHNICAL FIELD

The present disclosure relates to a testing apparatus with a testing chamber, a pressure loading unit for changing the pressure in the testing chamber and at least one measuring head for measuring a measurement object arranged in the testing chamber at different pressure values produced by the pressure loading unit.

The present disclosure relates in particular to testing apparatuses which measure the measurement object interferometrically, for example by shearography. This involves evaluating phase images which are recorded at different pressure values, and consequently in different loading states of the measurement object, in order to ascertain the deformation of the measurement object between the two states. In particular, defects within the measurement object that lead locally to a different expansion behavior of the measurement object under the change in pressure can be detected in this way.

BACKGROUND

In particular, the testing apparatus may be a tire testing apparatus. In such an apparatus, the tire is measured in the testing chamber at different pressure values with the measuring head in order to detect defects of the tire, in particular defects within the tire.

Conventional tire testing apparatuses usually operate with negative pressure, that is to say that, after the measurement object has been introduced into the testing chamber, the pressure loading unit lowers the pressure inside the testing chamber and then raises it again to ambient pressure. The measuring of the measurement object can in this case be performed both during the phase of generating the negative pressure, that is to say with increasing negative pressure, and during the phase of reducing the negative pressure, that is to say with decreasing negative pressure, as well as in both phases.

According to the prior art, the negative pressure is generated in the testing chamber with a pump which is in connection with the testing chamber with pipelines. The negative pressure is released either by opening an inflow opening, through which air flows into the testing chamber from the surroundings on account of the pressure difference, or actively by pumping air into the testing chamber.

Such tire testing apparatuses are known from the publications DE102013010402A1, EP2851670B1, DE102005049607A1, EP 3 521 796 A1, DE10102232C2, DE102006015123B4, EP1959227B1, DE 10 2006 061 003 B4 and DE 10 2013 102 296 B4.

The inventors of the present disclosure have identified a series of disadvantages in the use of a negative pressure pump for generating the negative pressure. For instance, negative pressure generation with a negative pressure pump has the effect of air turbulence in the testing chamber, which can lead to movements or oscillations of the measurement object, and consequently to poorer image quality. Settling times are therefore also possibly necessary, but lead to longer testing times. Furthermore, exact control of the negative pressure profile is not possible, so that potentially poorer image quality is obtained. Furthermore, the use of a negative pressure pump leads to a comparatively high noise level and high energy consumption. In spite of these disadvantages, negative pressure pumps have been used for decades in the area of the testing apparatuses of the type in question. No alternative has been evident so far.

SUMMARY

It is an object of the present disclosure to provide an improved testing apparatus.

The object is achieved by a testing apparatus as described herein.

The present disclosure includes a testing apparatus with a testing chamber, a pressure loading unit for changing the pressure in the testing chamber and at least one measuring head for measuring a measurement object arranged in the testing chamber at different pressure values produced by the pressure loading unit. According to an aspect of the disclosure, it is provided here that, for changing the pressure in the testing chamber, the pressure loading unit changes the volume of the testing chamber while excluding air from the surroundings.

The configuration according to an aspect of the disclosure of the pressure loading unit can improve or avoid at least some of the problems mentioned above with regard to the use of negative pressure pumps. For example, the air flow problems and their adverse effect on the image quality can be improved or overcome, since far fewer air movements take place. Depending on the configuration, the pressure profile, in particular the negative pressure profile, can also be controlled more exactly. Furthermore, it is possible to reduce the cycle time and to operate with better efficiency and lower noise emissions.

According to one possible configuration of the present disclosure, the pressure loading unit includes a wall element of the testing chamber which is movable with respect to the testing chamber structure and by the movement of which the volume of the testing chamber can be changed.

Therefore, a desired pressure in the testing chamber can be set with the position of the wall element along its displacement path. In one possible configuration of the disclosure, the volume of the testing chamber, and consequently the pressure in the testing chamber, can therefore be controlled with the position of the movable wall element.

The use according to an aspect of the disclosure of a movable wall element gives rise in particular to the advantages described above of lower air flows inside the testing chamber, better control of the change in pressure, lower energy consumption and less noise.

In one possible configuration of the present disclosure, the movable wall element is in connection with the testing chamber structure in a sealed manner. The sealing may take place with a sliding seal or with a flexible seal, in order to maintain the exclusion of air from the surroundings during the movement of the wall element.

In one possible configuration of the present disclosure, the movable wall element is in connection with the testing chamber structure in a sealed manner with a flexible sealing element, in particular a bellows. Furthermore, a smaller displacement path could be sufficient, for example a flexible sealing element of foam rubber could also be used.

The movable wall element may be configured as a rigid wall element which is in connection with the testing chamber structure with a sliding seal or a flexible seal.

In one possible configuration of the present disclosure, the movable wall element is formed by a flexible diaphragm which is in connection with the testing chamber structure in a sealed manner. Depending on the required displacement path, for example a flat diaphragm, a beaded diaphragm, a disc diaphragm and/or a rolling diaphragm may be used. The diaphragm may for example be produced from a fabric-reinforced elastomer.

In one possible configuration of the present disclosure, when projected into a plane extending perpendicularly to its direction of movement, the movable wall element has a surface area of at least 5% of the square of the cube root of the volume of the testing chamber. The square of the cube root of the volume of the testing chamber corresponds in this case to the surface area of a side wall of an imaginary testing chamber which has the form of a cube and has the same volume as the actual testing chamber. Therefore, according to this configuration, the surface area in of the movable wall element is at least 5% of the wall area of such a side wall of a cube of the same volume as the testing chamber.

When projected into a plane extending perpendicularly to its direction of movement, the surface area of the movable wall element is typically at least 10%, more typically at least 30%, of the square of the cube root of the volume of the testing chamber.

An appropriate size of the wall element can have the effect that a smaller displacement path is required and that air turbulences possibly occurring are reduced.

The size of the wall element is only restricted in the upward direction by the size of the wall of the testing chamber in which the wall element is arranged.

In one possible configuration of the present disclosure, when projected into a plane extending perpendicularly to its direction of movement, the movable wall element has a surface area of at least 0.05 m$^2$, typically of at least 0.2 m$^2$, more typically of at least 0.5 m$^2$. These dimensions give sizes that are typical in particular for tire testing apparatuses.

In one possible configuration of the present disclosure, the testing apparatus has a drive with which the movable wall element can be moved. The drive is in particular a servomotor with which the position of the movable wall element along its displacement path can be set.

The testing apparatus typically has a controller which controls the drive in such a way that the movable wall element moves along its displacement path according to a predetermined displacement-time curve and in this way produces a defined pressure-time profile in the testing chamber.

The testing apparatus typically has a controller which controls the drive and the at least one measuring head in such a way that the measurement object is tested by the at least one measuring head in at least one measurement cycle, in which the pressure in the pressure chamber is changed by a movement of the movable wall element.

In particular, this may involve automatically controlling the drive and/or the measuring head, so that the measurement object is tested automatically.

A measurement cycle typically includes at least a first movement of the movable wall element from a starting position, in which ambient pressure prevails inside the testing chamber, into a loading position, in which the pressure inside the testing chamber was changed in a first direction by the movement of the movable element, and at least a second movement, by which the pressure inside the testing chamber is changed back in the opposite direction to the ambient pressure.

In this case, a movement profile in which the movable element is moved in a specific manner along its displacement path is typically stored in the controller. This allows an appropriate pressure profile to be produced inside the testing chamber.

One particular advantage of the present disclosure is that controlling the pressure level inside the testing chamber by the movement of the movable wall element over its displacement range can also be used for controlling the transition between a loading phase and an unloading phase without the occurrence of loading peaks. By contrast, when a negative pressure pump has been used, pressure pulses often occurred when switching over the pumping direction, leading to an undesired oscillating effect to be induced in the measurement object.

In one possible configuration of the present disclosure, the drive is a linear drive. This makes particularly easy control of the volume of the testing chamber possible, and consequently the pressure inside the testing chamber. For example, the linear drive may be a spindle drive. Alternatively, the use of a pneumatic or hydraulic cylinder would also be conceivable.

In one possible configuration of the present disclosure, the drive is an electric drive, in particular an electromotive drive.

In a typical configuration of the present disclosure, the drive and/or the pressure loading unit includes a measuring arrangement with which the position of the movable wall element along its displacement path can be determined. This may be for example an encoder integrated in the drive.

In one possible configuration of the present disclosure, the movable wall element is arranged in the region of the ceiling of the testing chamber. This allows easy retrofitting also to be carried out in the case of existing testing apparatuses. Furthermore, there is no need for any decisive intervention in the way in which known testing apparatuses are structurally designed. For example, the existing ceiling of the testing chamber may be supplemented or replaced by the movable wall element.

The movable wall element may however also be arranged in any other wall regions, in particular in the region of one or more side walls, or in the floor of the testing chamber.

In one possible configuration of the present disclosure, movable wall elements are respectively provided on opposite sides of the testing chamber. These are typically configured in the way already described above. The wall elements are typically synchronously controlled. The control typically takes place symmetrically. Two movable wall elements arranged on opposite sides of the testing chamber allow the occurrence of unwanted air turbulences inside the testing chamber to be reduced further.

Using a change in volume for changing the pressure in the testing chamber as provided by the disclosure also already allows a significant reduction in the energy requirement without further measures, since the great frictional losses that occur when pumps are used can be avoided.

In one possible configuration of the present disclosure, the testing apparatus also includes an energy recovery unit for the energy recovery of the energy released by relieving the pressure in the testing chamber. This allows the energy requirement of the testing apparatus to be significantly reduced once again.

In one possible configuration of the present disclosure, the energy stored in the energy recovery unit is used for renewed pressure loading of the testing chamber.

In particular, at least part of the energy released when the pressure in the testing chamber is relieved is therefore stored in the energy recovery unit and then used for the pressure loading of the testing chamber with the pressure loading unit.

In one possible configuration of the present disclosure, the energy recovery may be performed with the drive of the pressure loading unit, for example in that, when the pressure is relieved, the drive converts the energy released and feeds it to a storage unit. In the case of an electric drive, it may for example act as a generator and the energy may be stored in an electrical energy storage unit. In the case of a hydraulic or pneumatic drive, the energy which is recovered by the drive may be stored in a pneumatic or hydraulic storage unit.

In a further configuration, the energy recovery unit can assist the drive in relieving the pressure and/or act on the movable wall element in parallel with the drive.

In one possible configuration of the present disclosure, the energy recovery unit includes a force compensator, which produces a counter force to the compressive force which in the loaded state exerts a load on the pressure loading unit and in particular the movable element. As a result, the force that has to be applied by the drive is reduced.

In one possible configuration of the present disclosure, the energy recovery unit may include at least one spring unit, in particular an air spring unit. The spring unit may include one or more springs which are tensioned when the pressure in the testing chamber is relieved and assist the drive when applying pressure loading.

In one possible configuration of the present disclosure, the energy recovery unit may include at least one linearly operating force element. In particular, this may be a spring element, in particular an air spring element, in particular a spring element which changes in length on the basis of the force applied.

In one possible configuration of the present disclosure, the linearly operating force element is deflected on the movable wall element in such a way that the force component of the energy recovery unit effectively acting on the movable element in the direction of movement is adapted to the static forces on the movable wall element acting in the respective displacement position and typically at least partially, and more typically largely, compensates for this.

In one possible configuration of the present disclosure, a movable wall element of the pressure loading unit is in connection with at least one linearly operating force element, in particular a spring element, in such a way that the direction of the force of the force element changes with respect to a direction of movement of the movable wall element over the displacement range of the movable wall element. As a result, a corresponding change in the force components acting in the direction of movement is possible.

In a typical configuration, the angle between the direction of the force of the force element and the direction of movement of the movable wall element increases when there is a movement of the wall element in the relieving direction and decreases when there is a movement in the loading direction. As a result, the force component which is generated by the force element and acts in the direction of movement is greater in a first, loaded position than in a second, relieved position.

In one possible configuration of the present disclosure, the movable wall element of the pressure loading unit is in connection with the testing chamber structure with at least two force elements, in particular in the form of spring elements, in such a way that the components of the forces that are generated by the force elements and act transversely to the direction of movement of the movable wall element cancel one another out and the components that act in the direction of movement are cumulative. For example, a symmetrical arrangement of the multiple force elements with respect to a center axis of the wall element is conceivable.

In one possible configuration of the present disclosure, the pressure loading unit generates a negative pressure in the testing chamber. In particular, the pressure loading unit is therefore configured in such a way that it increases the volume of the testing chamber while excluding air from the surroundings in order to reduce the pressure inside the testing chamber from the ambient pressure.

In particular, the movable wall element can be moved outwards in order to increase the volume of the testing chamber.

The testing apparatus according to an aspect of the disclosure may be in particular a tire testing apparatus. This may be configured in the way already described at the beginning with regard to the prior art.

Inside the testing chamber, the tire testing apparatus may have a bearing surface on which the tire lies. In particular, the tire may in this case lie with its sidewall on a bearing surface. Alternatively, it would be conceivable that the tire lies with the bead on holding elements.

In one possible configuration of the present disclosure, the measuring head is arranged inside the testing chamber.

If it is a tire testing device, at least one measuring head may typically be moved into the interior of the tire with a moving arrangement.

In one possible configuration of the present disclosure, the measuring head is rotatable relative to the tire about the axis of the tire, in order to test the circumference of the tire portion by portion in multiple rotational positions. As an alternative or in addition, multiple measuring heads may be used in order to test different portions of the circumference of the tire.

According to one possible configuration according to an aspect of the present disclosure, the testing apparatus may be a testing apparatus operating on an interferometric measuring principle, the testing apparatus typically operating shearographically. The measuring head may be an interferometric measuring head, in particular a shearographic measuring head.

The present disclosure also includes a method for testing a measurement object by a testing apparatus, with the steps of:
  introducing the measurement object into a testing chamber of the testing apparatus, and
  measuring the measurement object arranged in the testing chamber at different pressure values.

The method is characterized in that the changing of the pressure in the testing chamber is performed by changing the volume of the testing chamber while excluding air from the surroundings.

The method according to the disclosure gives rise to the same advantages that have already been described above with regard to the testing apparatus according to the disclosure.

The measurement object is typically a tire.

The method according to the disclosure is typically performed as already described above with regard to the testing apparatus. In particular, the method may be performed by using a tire testing apparatus as described above.

BRIEF DESCRIPTION OF THE DRAWINGS

The disclosure will now be described with reference to the drawings wherein.

DESCRIPTION OF EXEMPLARY EMBODIMENTS

Figure 1:
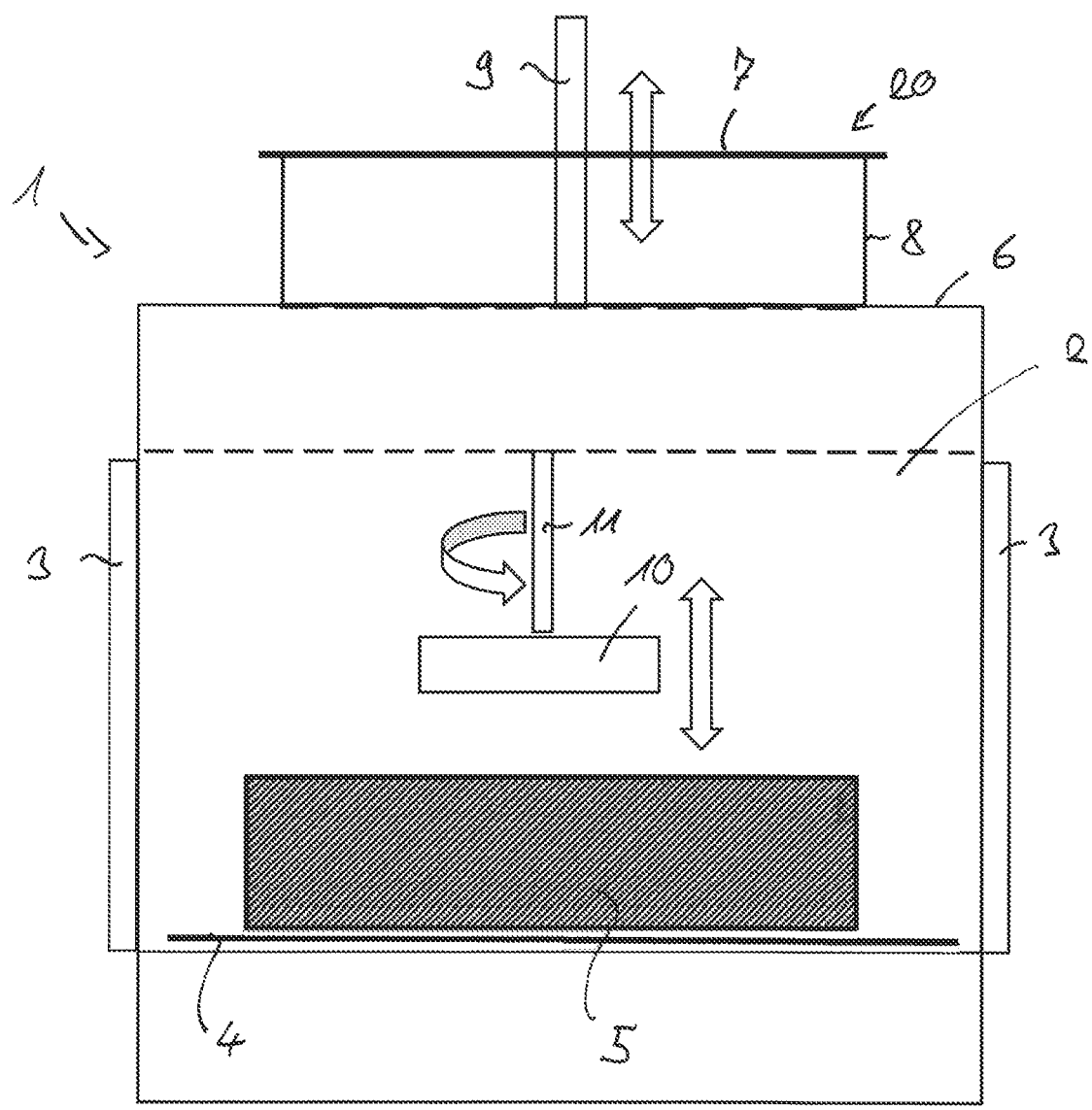
FIG. 1 shows a testing apparatus in a basic representation from the side according to an exemplary embodiment of the disclosure.

FIG. 1 shows a testing apparatus according to an exemplary embodiment of the disclosure in a basic representation from the side. The testing apparatus 1 has a testing chamber 6, in which a measurement object 5 to be tested can be arranged. In the exemplary embodiment, a bearing surface 4, on which the measurement object 5 is arranged, is provided for this inside the testing chamber 6. Also provided is at least one measuring head 10, with which the measurement object 5 arranged in the testing chamber 6 is measured.

In the exemplary embodiment, the testing apparatus has door elements 3, with which the testing chamber can be opened and closed in order to introduce measurement objects into the testing chamber and remove them from it. In the exemplary embodiment, two door elements 3 are arranged in opposite side wall regions of the testing chamber. This allows measurement objects to be introduced into the testing chamber on one side and to be transported out of the testing chamber on the other side. However, any other configurations of the testing chamber are also conceivable.

The testing apparatus has a pressure loading device 20, with which the pressure inside the testing chamber 6 can be changed in a controlled manner. The pressure loading unit 20 includes a movable wall element 7, by the movement of which the volume of the testing chamber 6 can be changed in order in this way to change the pressure inside the testing chamber.

Provided for this is a drive 9, with which the movable wall element 7 can be moved along a displacement path in order thus to control the interior volume of the testing chamber 6 and thereby control the pressure inside the testing chamber with the position of the movable wall element.

Here, the movable wall element 7 is in connection with the rest of the testing chamber structure with a seal 8. The movement of the movable wall element 7 takes place while excluding air from the surroundings from the testing chamber, so that, by changing the interior volume, a corresponding change in the pressure inside the testing chamber is achieved.

In the exemplary embodiment, the drive 9 is a linear drive, the movable element being movable linearly along a displacement path. In the exemplary embodiment, the displacement path, and consequently the direction of movement, is perpendicular to the main plane of extent of the wall element 7.

However, other configurations of the displacement path or the drive are also conceivable. For example, it would be conceivable to arrange the wall element on the testing chamber structure pivotably in the manner of a flap with a corresponding seal and correspondingly provide a drive which pivots the wall element.

In the exemplary embodiment, the drive 9 is a servo drive with which the position of the displacement element along the displacement path can be controlled. This allows the pressure inside the testing chamber to be controlled in a specific manner.

The displacement path is dependent on the one hand on the change in pressure required for the testing, in particular the required negative pressure, and on the other hand on the seal-tightness of the testing chamber. Since the exclusion of air under which the changing of the volume of the testing chamber takes place is never complete, a correspondingly greater displacement path than the displacement path necessary when there is complete air exclusion must be provided. For example, an additional factor of for example 10 to 20% of the displacement path may be provided here.

The volume of the testing chamber is inversely proportional to the pressure in the measuring chamber. As a result, for example, for reducing the pressure by about 0.05 bar, an increase in volume by about 5% is necessary (although the relationship is not really linear). If in one possible exemplary embodiment the testing chamber has for example a volume of 5 $m^3$, this can be increased by 0.3 $m^3$ in order to be able to make a negative pressure of about 50 mbar available (while taking into account possible leakages).

In the case of the testing apparatus shown in FIG. 1, the at least one measuring head 10 is typically an interferometric measuring head, in particular a shearographic measuring head. This involves laser light being radiated onto the surface of the tire and reflected onto a sensor in two part-beams with an optical unit of the measuring head, which includes a shearing element. In this way, phase images of the measurement object are recorded.

A controller of the testing apparatus controls the pressure loading unit 9 and the at least one measuring head 10 in such a way that recordings are produced in multiple pressure loading states of the measurement object and are then evaluated by the controller in order to test the measurement object. In particular, this involves producing phase difference images, which show the deformation of the measurement object due to the pressure loading or relieving.

Within a measurement cycle, typically at least one pressure loading phase and at least one pressure relieving phase take place. The recordings may be made during the pressure loading phase, during the pressure relieving phase or during both phases.

The testing apparatus may have a plurality of measuring heads in order to test multiple sectors of the measurement object simultaneously. Typically, at least some of the measuring heads can be moved into the interior of the tire in order to test the inner side of the tire. Measuring heads may also be provided to test the sidewalls of the tire from the outside.

The testing apparatus shown in FIG. 1 is typically a tire testing apparatus for testing a tire 5.

In one possible configuration, the measuring head arrangement may be rotatable about an axis of rotation which coincides with the axis of rotation of the tire in order to test the tire in multiple positions in the circumferential direction. The measuring heads may however also be arranged rotationally fixed with respect to the bearing 4 for the tire.

In the case of the exemplary embodiment shown in a basic representation in FIG. 1, the pressure loading unit 20 is arranged in the region of the ceiling of the testing chamber 6. It could however be arranged in the same way in the region of one of the side walls or in the region of the floor. Furthermore, multiple pressure loading devices could be provided in opposite wall regions of the testing chamber.

Figure 2:
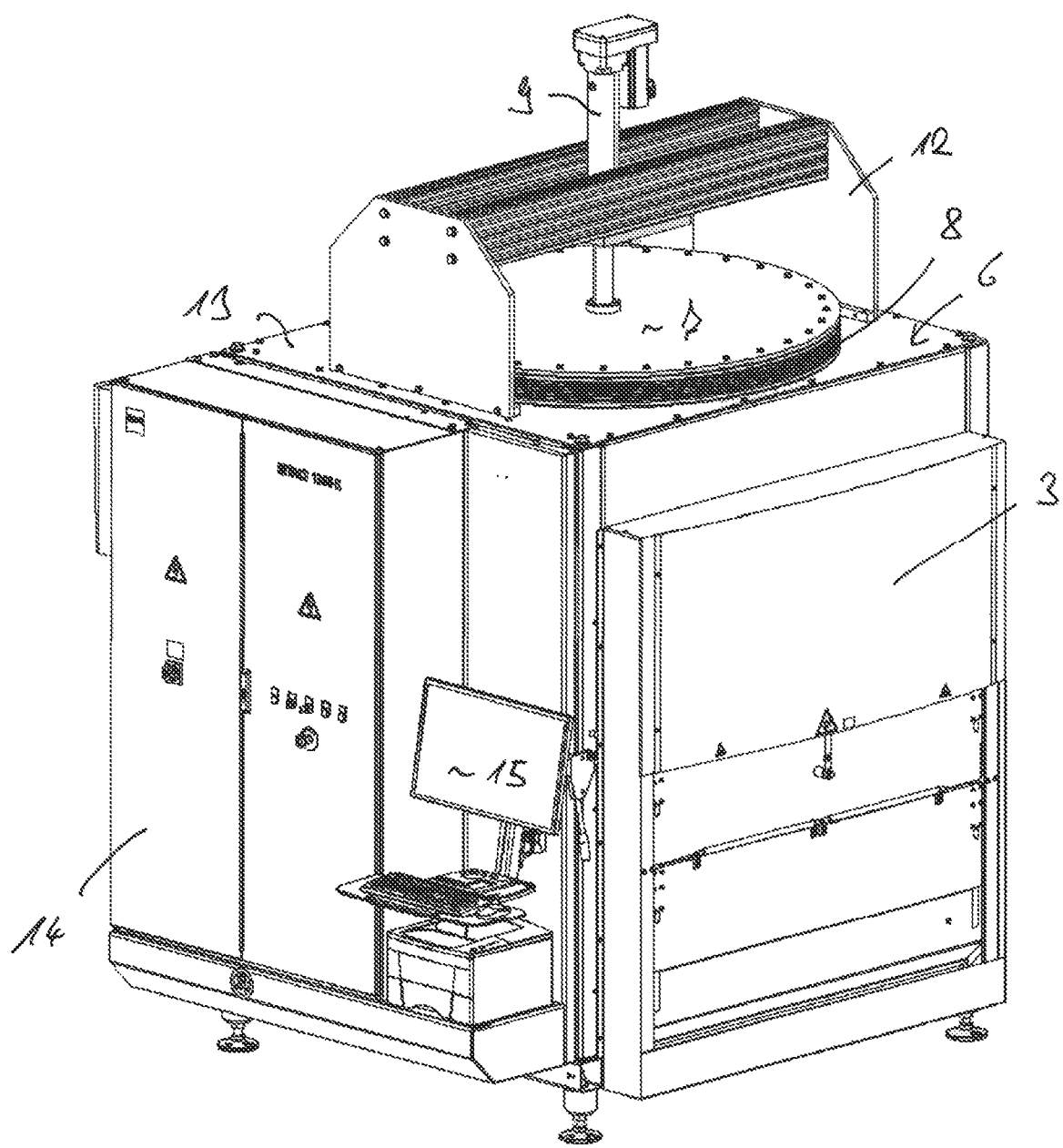
FIG. 2 shows the testing apparatus in a perspective view, the pressure loading unit being shown in an unloaded state according to an exemplary embodiment of the disclosure.
Figure 3:
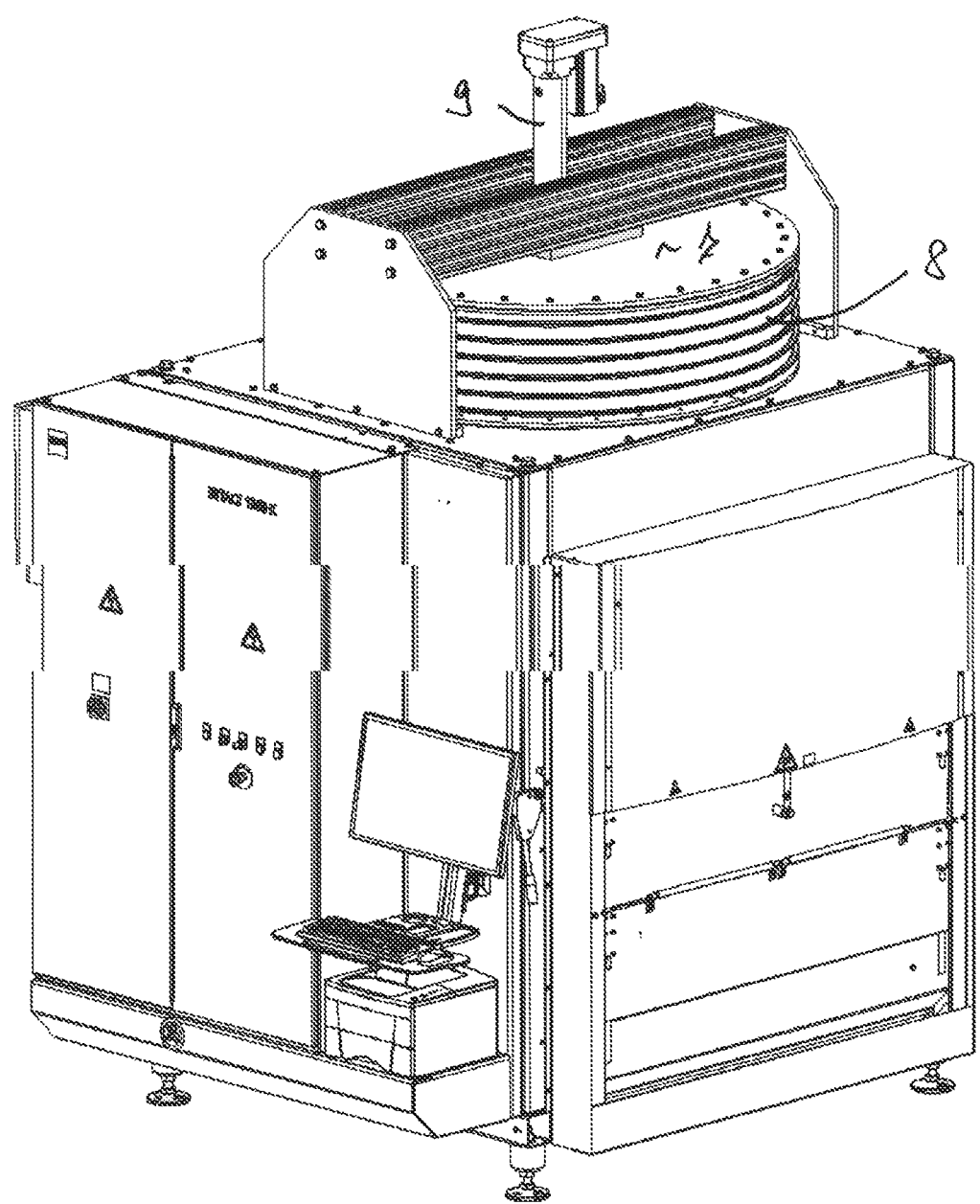
FIG. 3 shows the testing apparatus shown in FIG. 2, the pressure loading unit being shown in a pressure loading state.
Figure 4A:
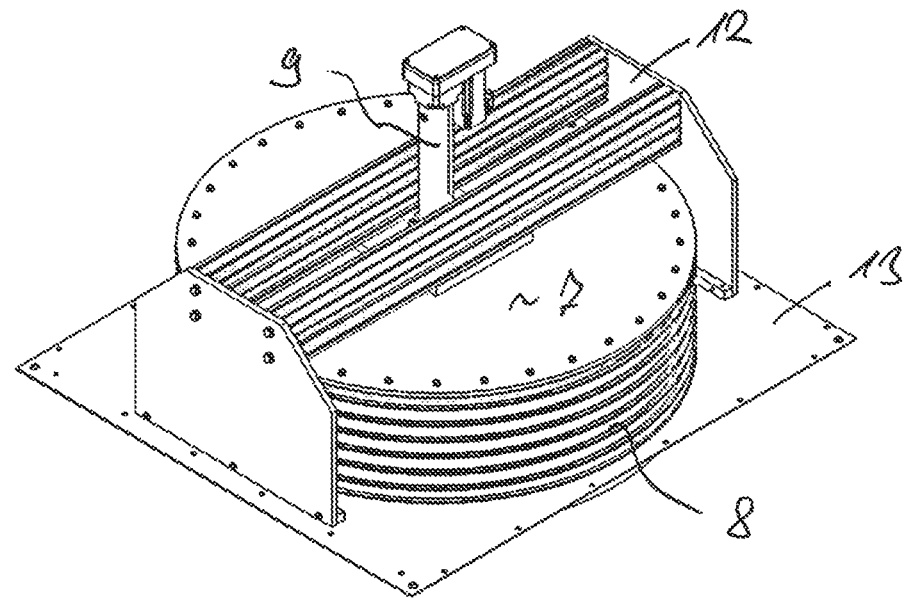
FIGS. 4A and 4B show the pressure loading unit of the testing apparatus shown in FIGS. 2 and 3 in a pressure loading state and an unloaded state.
Figure 4B:
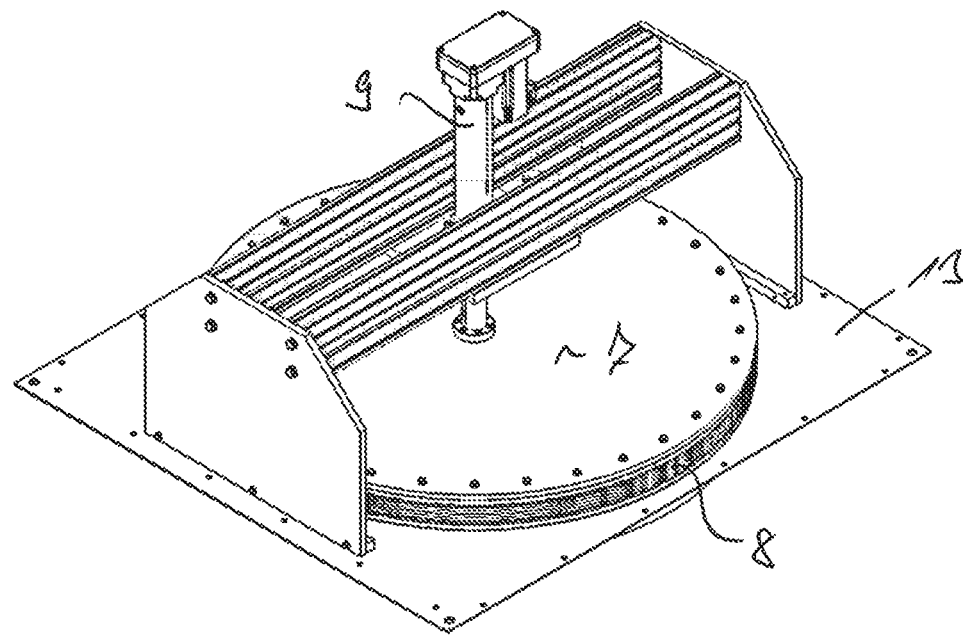

FIGS. 2 to 4 show a specific exemplary embodiment of a testing apparatus and the pressure loading unit used here. The specific exemplary embodiment corresponds in its structure to the basic configuration already shown in FIG. 1, so that initially reference is made to the description in relation to FIG. 1.

In FIG. 2, the testing apparatus is shown in a perspective view from the outside. FIG. 2 shows in addition to the elements of the testing apparatus that are shown in FIG. 1 a control cabinet 14 with the controller of the testing apparatus, and also an input/output unit 15 for the controller, in particular with a display and input elements. Furthermore, the specific configuration of the door elements 3 as sliding doors operating in the vertical direction is shown.

FIG. 2 also shows a specific structural configuration of the pressure loading unit. The movable wall element 7 is in connection with a wall region of the testing chamber arrangement 6 here with a flexible seal 8. In the exemplary embodiment, the movable wall element 7 is in this case in connection with a ceiling panel 13 of the testing chamber arrangement with the flexible seal 8. The flexible seal 8 therefore allows a movement of the movable wall element 7 with respect to the testing chamber arrangement, and thereby changing of the volume in the testing chamber while excluding air from the surroundings.

In the exemplary embodiment, a bellows is used as the seal 8. This allows a relatively great displacement path. The wall element 7 is embodied as a rigid panel, so that the change in volume produced by a movement of the wall element corresponds substantially to the base area of the flexible wall element 7 multiplied by the displacement path.

Alternatively, it would be conceivable to use a diaphragm as the movable wall element 7.

In the exemplary embodiment, a linear drive 9 is used as the drive, for example a spindle drive with an electric drive motor. The drive 9 is arranged on a portal element 12, which is in connection with the testing chamber arrangement and absorbs the forces which are produced during the movement of the movable wall element 7. In the exemplary embodiment, the portal element 12 is fastened to the ceiling panel 13 of the testing chamber on opposite sides of the movable wall element 7.

In the exemplary embodiment, the movable wall element has a circular base area. This allows the seal 8 to absorb the forces occurring particularly well.

In particular, the embodiment is configured in such a way that the pressure loading of the seal 8, and in particular of the bellows, takes place radially outwards, since in this direction the compressive forces occurring can be absorbed by the seal and in particular the bellows.

Figure 5A:
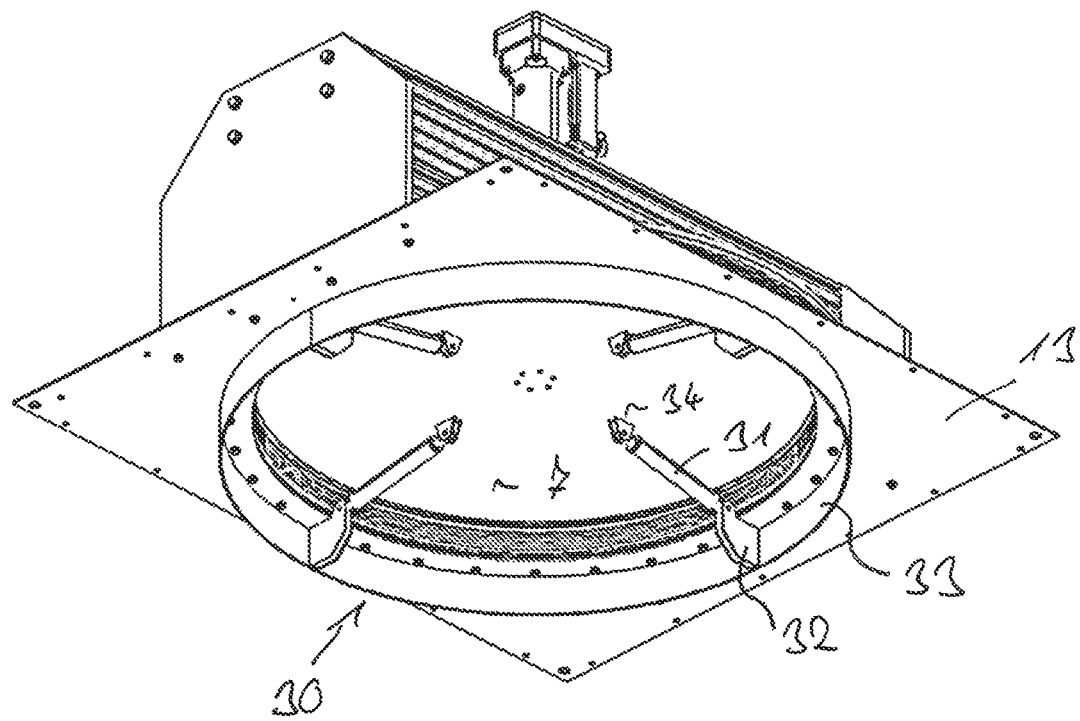
FIGS. 5A and 5B show a configuration of the pressure loading unit with an energy recovery unit in an unloaded state in a perspective representation and a sectional view.
Figure 5B:
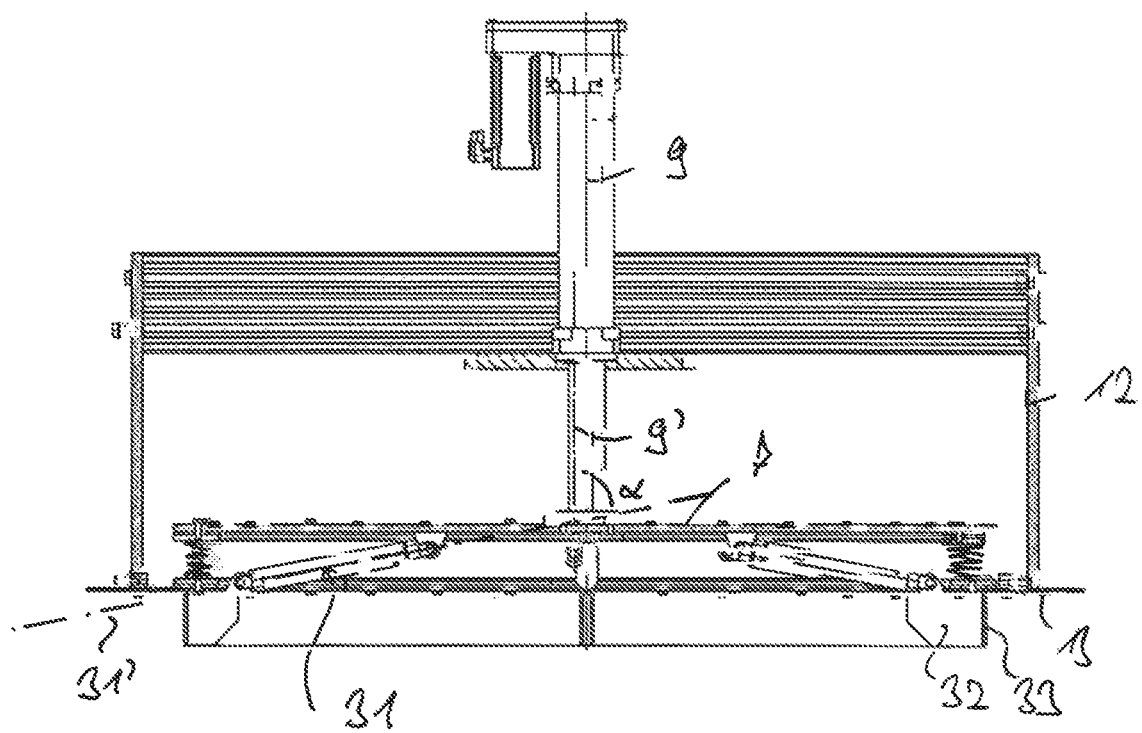
Figure 6A:
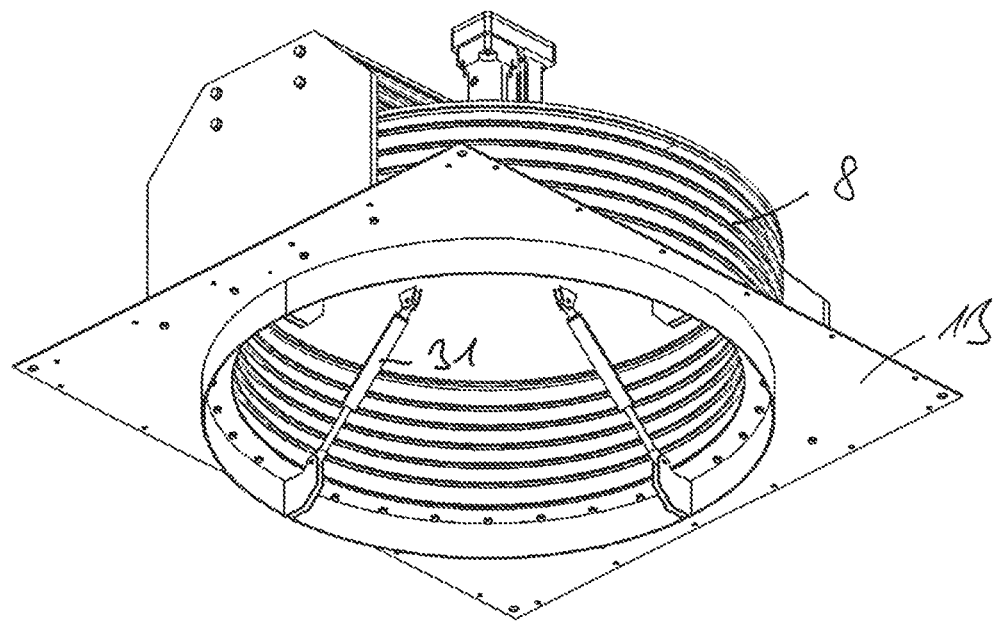
FIGS. 6A and 6B show the configuration of the pressure loading unit with an energy recovery unit in a pressure loading state in a perspective representation and a sectional view.
Figure 6B:
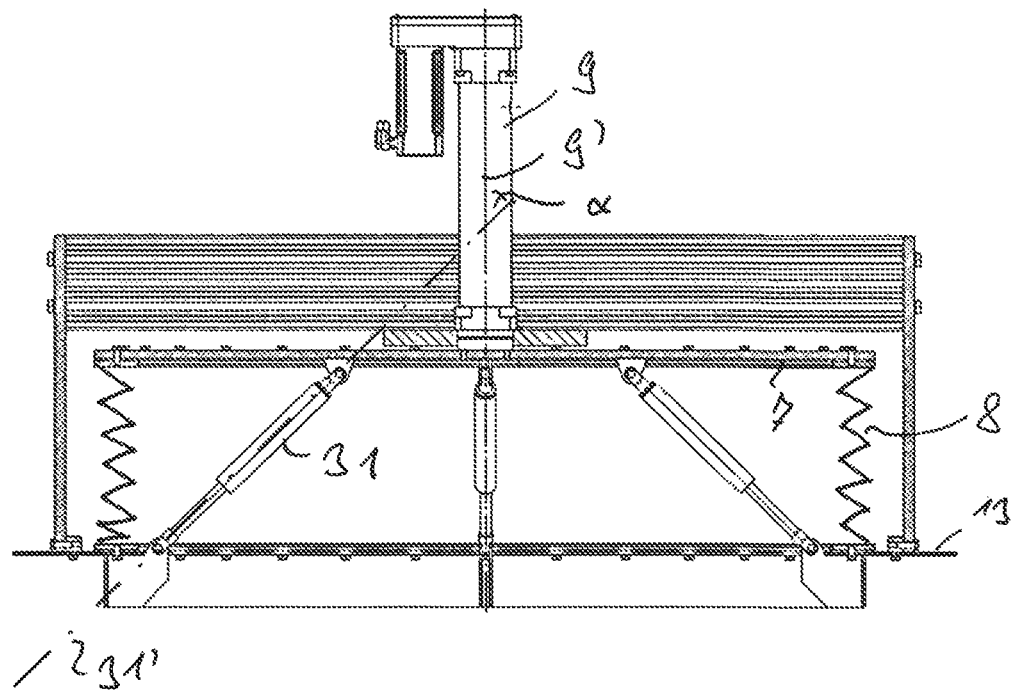

As can be seen in FIGS. 5 and 6, the static testing chamber structure has a corresponding opening, which is covered by the movable wall element.

In the exemplary embodiment, the pressure loading unit generates a negative pressure, in that the movable wall element 7 is moved outwards with the testing chamber closed, in order to increase the volume of the testing chamber. The pressure is relieved by the movable element 7 being moved back again into its starting position. The starting position is in this case shown in FIGS. 2, 4B, and 5, the loaded position in FIGS. 3, 4A, and 6.

In an exemplary embodiment, the changing of the pressure, in particular by generating a negative pressure, is performed in order to make the defects of the measurement object visible with shearography.

For example, in the testing procedure, the pressure in the testing chamber may be lowered by 5 mbar to 100 mbar, in particular by 15 mbar to 75 mbar, for example by 25 to 50 mbar, with respect to the ambient pressure and equalized again. The image recording of multiple images of the shearography sensor takes place during the phase of lowering pressure or during the re-equalizing to ambient pressure or—in the case of a symmetrical loading cycle for example—also during both phases. The recorded images can therefore be used to calculate a shearogram of the observed region of the tire, on the basis of which the defects of the tire can be detected.

This solution according to an aspect of the disclosure allows the air flow problems described at the beginning and their adverse effect on the image quality to be reduced or even overcome entirely, since far fewer air movements take place. The negative pressure/time behavior (negative pressure profile) can be exactly controlled with the position of the cover (servo axis). In this way—perhaps additionally in combination with new evaluation algorithms—better image quality can be achieved.

Furthermore, the testing apparatus according to an aspect fo the disclosure can operate significantly more quickly than known testing apparatuses. The evacuation time can be reduced considerably.

Furthermore, the inexact switching over from evacuation to ventilation in the case of known testing apparatuses with negative pressure pumps can be managed better, which similarly contributes to improving the image quality and to reducing the testing time.

In comparison with known testing apparatuses, the testing apparatus according to an aspect of the disclosure can also have much better efficiency. For instance, an energy saving of about 50% can already be obtained without further measures. Likewise, the noise nuisance is reduced.

FIGS. 5 and 6 also show an energy recovery unit, by which the energy released during the pressure relieving phase can be stored and used again for the pressure loading.

In the exemplary embodiment, the energy recovery unit is configured as a force compensator which counteracts the compressive force. The force compensator is typically configured in such a way that it compensates both static weight forces and static compressive forces.

In the exemplary embodiment, multiple compression springs 31 are provided for this, pivotably articulated with one side on the movable wall element 7 and with the other side on the testing chamber structure. The arrangement has the effect that the angle $\alpha$ between the direction of the force 31' of the compression springs 31 and the direction of movement 9' of the movable element changes over the displacement path. In the loaded position shown in FIG. 6, the angle $\alpha$ is smaller than in the relieved position shown in FIG. 5, so that the component of the counter force is generated by the compression springs, which acts in the direction of movement, is greater.

The multiple compression springs 31 are arranged symmetrically, so that the force components acting transversely to the direction of movement 9' of the movable element 9 cancel one another out. By contrast, the force components acting in the direction of movement are cumulative.

The structural design can be easily achieved by using spring assemblies or gas springs. In the exemplary embodiment, these are attached in such a way that, when the cover is moving up, there is an increasing counter force on the cover.

The force compensator is typically configured in such a way that this counter force is equal to the sum of the movable mass and the negative pressure occurring, so that the static forces acting on the movable wall element are in equilibrium over the displacement path.

In the exemplary embodiment, multiple springs 31 arranged in the form of a star are provided for this, the outer ends of which are articulated with bearing points 32 on a frame 33 of an opening in a wall of the testing chamber and the inner ends of which are articulated with bearing points 34 on the movable wall element 7, so that the angle of the springs in relation to the direction of movement of the movable element changes depending on the position of the movable wall element 7.

The angles are typically chosen in such a way that the characteristic of the springs substantially corresponds to the characteristic that the movable element has. This characteristic arises from the static weight force of the movable element and the compressive force acting on it due to the negative pressure.

The energy saving can be further improved by the exemplary embodiment with an energy recovery unit or an additional force compensator. With a force compensator, the process forces occurring due to the movable masses can be cancelled out. As a result, the necessary energy requirement is reduced to a fraction of known testing apparatuses (about 20%).

It is understood that the foregoing description is that of the exemplary embodiments of the disclosure and that various changes and modifications may be made thereto without departing from the spirit and scope of the disclosure as defined in the appended claims.

What is claimed is:

1. A testing apparatus for testing a tire, the testing apparatus comprising:
   a testing chamber formed by a plurality of wall elements, the wall elements being configured such that a tire can be arranged as a measurement object to be tested inside the testing chamber and such that the tire is surrounded by the plurality of wall elements for testing;
   a pressure loading unit configured to change a pressure in the testing chamber; and
   at least one measuring head configured to measure a measurement object arranged in the testing chamber at different pressure values produced by the pressure loading unit,
   wherein, to change the pressure in the testing chamber, the pressure loading unit changes the volume of the testing chamber while excluding air from the surroundings,
   wherein at least one of the plurality of wall elements of the testing chamber is a movable wall element and forms a part of the pressure loading unit,
   wherein the movable wall element is movable with respect to a remainder of a testing chamber structure, and
   wherein the pressure loading unit is configured such that the volume of the testing chamber is changed by a movement of the movable wall element with respect to the remainder of the testing chamber structure.

2. The testing apparatus according to claim 1, wherein the movable wall element is in connection with the remainder of the testing chamber structure in a sealed manner, and
   wherein the changing of at least one of the volume and the pressure can be controlled with the position of the movable wall element.

3. The testing apparatus according to claim 2, wherein the movable wall element is in connection with the testing chamber structure in a sealed manner with a flexible sealing element, and/or
   wherein the movable wall element is formed by a flexible diaphragm which is in connection with the testing chamber structure in a sealed manner.

4. The testing apparatus according to claim 2, wherein the flexible sealing element is a bellows.

5. The testing apparatus according to claim 1, wherein, when projected into a plane extending perpendicularly to its direction of movement, the movable wall element has a surface area of at least 5% of the square of the cube root of the volume of the testing chamber, at least 10%, or at least 30%, and/or
   wherein, when projected into a plane extending perpendicularly to its direction of movement, the movable wall element has a surface area of at least 0.05 $m^2$, of at least 0.2 $m^2$, or of at least 0.5 $m^2$.

6. The testing apparatus according to claim 1, wherein the pressure loading unit is configured to change the volume of the testing chamber by at least 0.5%, or by at least 1%, and/or
   wherein, by changing the volume of the testing chamber, the pressure loading unit is configured to change the pressure in the testing chamber by at least 5 mbar, and
   wherein the changing at least one of the volume and the pressure is controlled by the pressure loading unit with the position of the movable element.

7. The testing apparatus according to claim 1, further comprising:
   a drive with which the movable wall element can be moved, and
   wherein the testing apparatus has a controller which controls the drive and the at least one measuring head such that the measurement object is tested by the at least one measuring head in at least one measurement cycle, in which the pressure in the pressure chamber is changed by a movement of the movable wall element.

8. The testing apparatus according to claim 7, wherein the drive is a linear drive.

9. The testing apparatus according to claim 1, wherein the movable wall element is arranged in the region of the ceiling of the testing chamber, and/or
   wherein movable wall elements are provided on opposite sides of the testing chamber.

10. The testing apparatus according to claim 1, further comprising:
    an energy recovery unit configured to recover energy of the energy released by relieving the pressure in the testing chamber, and
    wherein the energy stored in the energy recovery unit is used for renewed pressure loading of the testing chamber.

11. The testing apparatus according to claim 10, wherein the energy recovery unit comprises a force compensator, which produces a counter force to the compressive force which in the loaded state exerts a load on the pressure loading unit and the movable element.

12. The testing apparatus according to claim 10, wherein the energy recovery unit comprises at least one spring unit, or an air spring unit, and/or
wherein the energy recovery unit comprises at least one linearly operating force element.

13. The testing apparatus according to claim 1, wherein a movable wall element of the pressure loading unit is in connection with at least one linearly operating force element, or a spring element, such that the direction of the force of the force element changes with respect to a direction of movement of the movable wall element over the displacement range of the movable wall element.

14. The testing apparatus according to claim 1, wherein the movable wall element of the pressure loading unit is in connection with the testing chamber structure with at least two force elements, or in the form of spring elements, such that the components of the forces that are generated by the force elements and act transversely to the direction of movement of the movable wall element cancel one another out and the components that act in the direction of movement are cumulative.

15. The testing apparatus according to claim 1, wherein the measuring head is an interferometric measuring head, or a shearography measuring head, and/or
wherein the pressure loading unit generates a negative pressure in the testing chamber.

16. A method for testing a measurement object by a testing apparatus, the testing apparatus including a testing chamber, a pressure loading unit configured to change a pressure in the testing chamber, and at least one measuring head configured to measure a measurement object arranged in the testing chamber at different pressure values produced by the pressure loading unit, the method comprising:
introducing a tire as the measurement object into the testing chamber of the testing apparatus, the testing chamber being formed by a plurality of wall elements, the wall elements being configured such that the tire is arranged inside the testing chamber and such that the tire is surrounded by the plurality of wall elements for testing;
changing the pressure in the testing chamber by changing a volume of the testing chamber while excluding air from the surroundings, wherein at least one of the plurality of wall elements of the testing chamber is a movable wall element and forms a part of the pressure loading unit, and wherein the volume of the testing chamber is changed by a movement of the movable wall element with respect to the remainder of the testing chamber structure; and
measuring the measurement object arranged in the testing chamber at different pressure values.

\* \* \* \* \*